United States Patent [19]

Böke et al.

[11] Patent Number: 4,846,517

[45] Date of Patent: Jul. 11, 1989

[54] APPARATUS FOR THE TRANSPORT OF TACKY PREPREG BLANKS

[75] Inventors: Karl-Heinz Böke; Heinz-Dietmar Orth, both of Dortmund; Hans-Heinrich Schulz, Holzwickede, all of Fed. Rep. of Germany

[73] Assignee: Hoesch Maschinenfabrik Deutschland AG, Dortmund, Fed. Rep. of Germany

[21] Appl. No.: 156,368

[22] Filed: Feb. 16, 1988

[30] Foreign Application Priority Data

Mar. 17, 1987 [DE]  Fed. Rep. of Germany ....... 3708629

[51] Int. Cl.$^4$ ................................................ B66C 1/02
[52] U.S. Cl. ...................................... 294/65; 294/64.1
[58] Field of Search ................. 294/65, 64.1; 414/627, 414/737, 744 B, 752; 271/90, 91, 103; 269/21; 248/362, 363

[56] References Cited

U.S. PATENT DOCUMENTS

| | | | |
|---|---|---|---|
| 3,102,751 | 9/1963 | Noble et al. | 294/65 |
| 3,865,420 | 2/1975 | Warren | 294/64.1 |
| 4,047,532 | 9/1977 | Phillips et al. | 294/64.1 |

Primary Examiner—James B. Marbert
Attorney, Agent, or Firm—Thomas S. Baker, Jr.

[57] ABSTRACT

To permit gripping of tacky prepreg blanks with stepped surface in an apparatus for the transport of tacky prepreg blanks comprising a suction head, a suction head suspension, a suction pump and a drive generating the movement of the suction head in the vertical and horizontal direction, the suction head (1) comprises a plurality of individually sprung suction tubes (12).

9 Claims, 3 Drawing Sheets

APPARATUS FOR THE TRANSPORT OF TACKY PREPREG BLANKS

The invention relates to an apparatus for the transport of tacky prepreg cut sections or blanks comprising a suction head, a suction head suspension, a suction pump and a drive which generates the movement of the suction head in the vertical and horizontal direction.

Such an apparatus is known from the congress handbook "13th Plastics Technology Colloquium of the IKV in Aachen from Mar. 5 to 7, 1986", pages 87 to 89, with FIGS. 15 and 20.

In this known apparatus for gripping tacky prepreg blanks a suction head with suction honeycombs of aluminium is employed.

Such a suction head is however not suitable for gripping tacky prepreg blanks with stepped surface.

The problem underlying the invention is to provide a suction head for an apparatus of the type mentioned at the beginning which permits gripping tacky prepreg blanks with stepped surface.

According to the invention this problem is solved in that the suction head comprises a plurality of individually sprung suction tubes.

Preferably, the suction tubes are made of plastic.

Each suction tube comprises a conical gripping face.

According to a further feature of the invention each suction tube is coupled to a tube coupling.

Hereinafter the invention will be described in detail with the aid of the drawings in which an example of embodiment is schematically illustrated.

In the drawings

Figure 1:
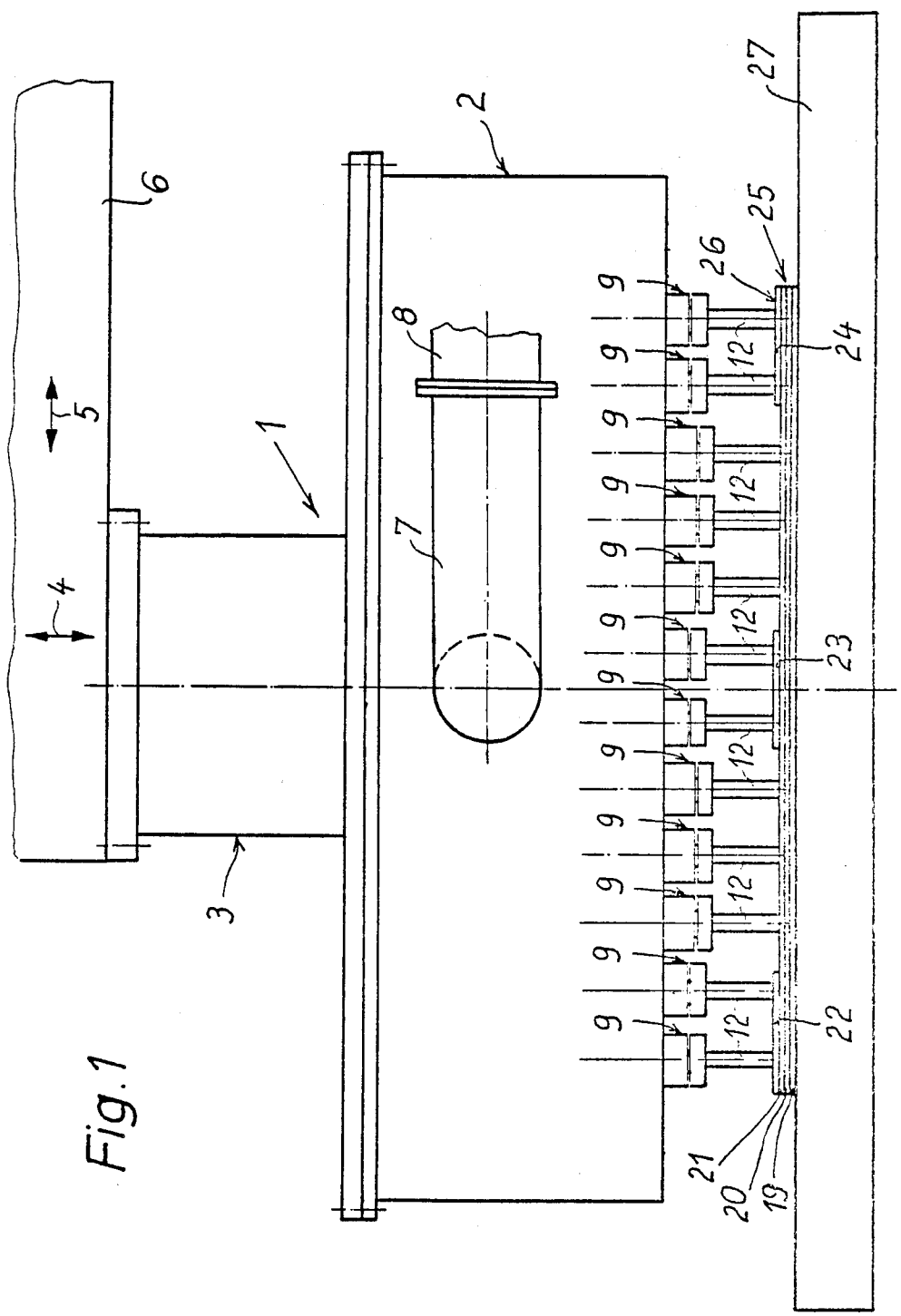
FIG. 1 is a partial view of an apparatus for transporting tacky prepreg blanks.
Figure 2:
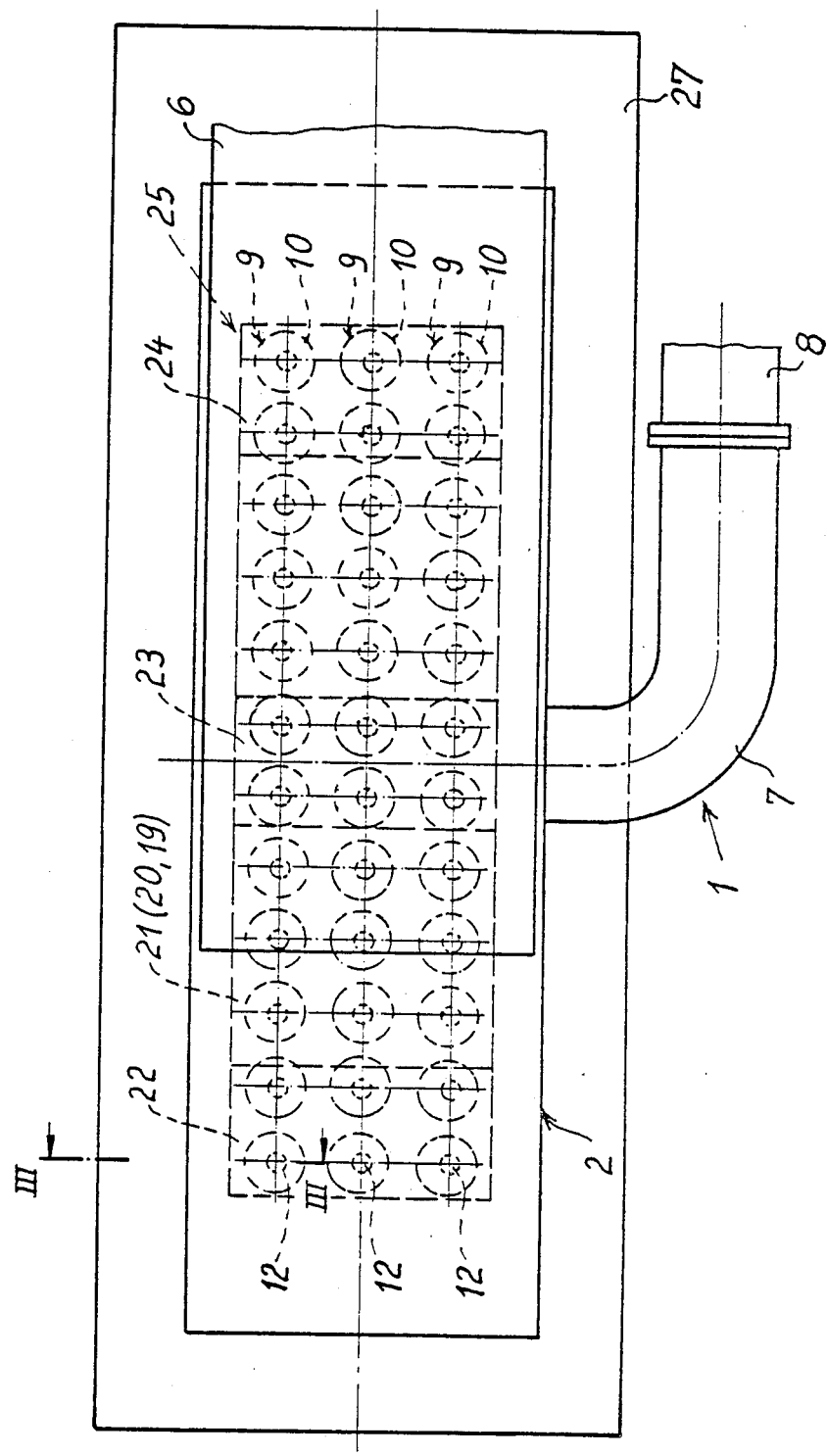
FIG. 2 is a partial plan view of the apparatus according to FIG. 1.
Figure 3:
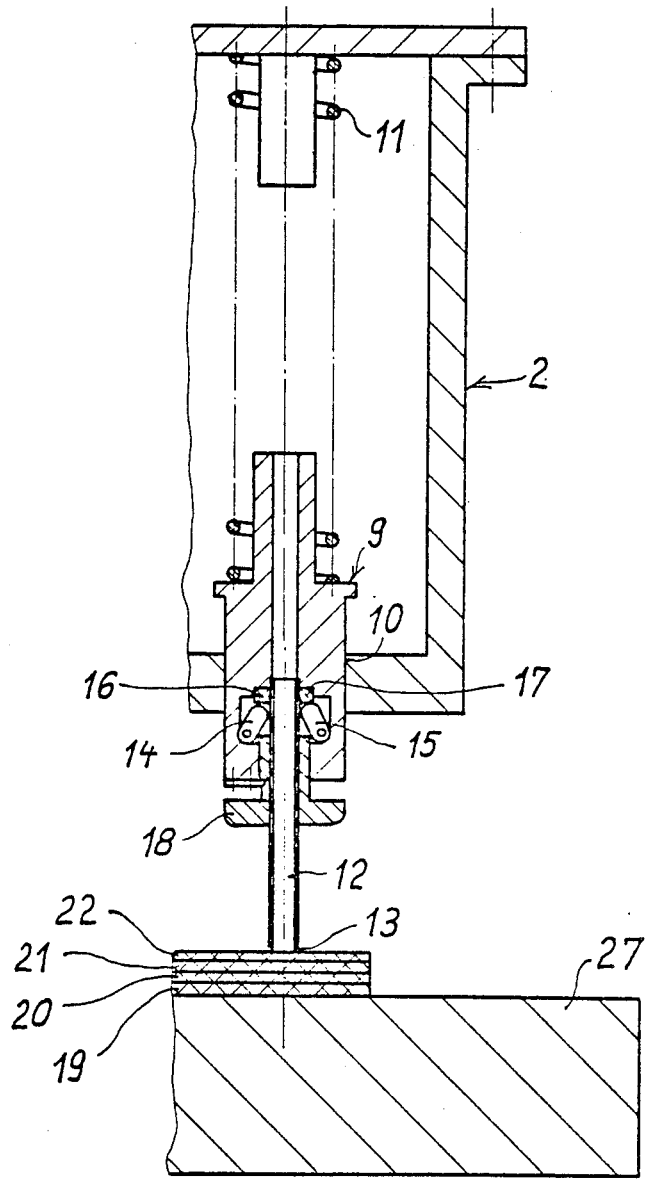
FIG. 3 is a partial section along the line III—III of FIG. 2 to a larger scale.

A suction head 1 contains a suction box 2 which is made with a holder 3. The holder 3 is mounted on an arm 6 movable in the vertical (double arrow 4) and horizontal direction (double arrow 5).

The suction head 1 comprises a connecting tube piece 7 to which a suction conduit 8 with a suction pump (not shown) is connected.

The suction box 2 comprises a plurality of individually sprung tube couplings 9 each of which is displaceable in a bore 10 in vertical direction (double arrow 4). For the spring suspension of each tube coupling 9 a pressure spring 11 with helical turns is provided.

A suction tube 12 of plastic is coupled to each tube coupling 9. Each tube coupling 9 comprises a conical gripping face 13. Each tube coupling 12 is held by two clamping jaws 14, 15 which are operatively connected to two spring elements 16, 17.

The clamping jaws 14, 15 are released by pushing up the sleeve 18 by hand.

FIG. 1 shows how the suction tubes 12 are placed onto a stack 25 formed from six tacky prepreg blanks 19, 20, 21, 22, 23, 24. The suction tubes 12 exert a force on the stack 25 which is the resultant of the pressure force of the pressure springs 11 and the weight of the tube couplings 9, suction tubes 12 and pressure springs 11.

The arrangement of the tacky prepreg blanks 19, 20, 21, 22, 23, 24 with respect to each other, resulting in the example of embodiment in a stepped surface 26 of the stack 25, depends substantially on the shape of the pressed part.

The tacky prepreg blanks 19 to 24 are mats of duroplastic plastic with fibreglass reinforcement (SMC).

During the conveying of the stack 25 from a table 27 to a press (not shown) the suction box 2 and the suction tubes 12 are under vacuum.

The tube couplings 9 ensure a rapid replacement of the suction tubes 12 to which segregations of the prepreg blanks adhere.

We claim:

1. A suction head apparatus for the transport of tacky prepreg blanks comprising:
   a suction box having a plurality of vertical coupling bores;
   a spring tube coupling having an axial tube bore which receives a suction tube mounted for vertical displacement in each coupling bore;
   spring means for biasing said suction tube couplings vertically downwardly in said coupling bores;
   retaining means within each tube coupling for retaining said suction tube within said tube coupling;
   wherein said retaining means includes a pair of clamping jaws mounted within each tube coupling for engaging said suction tube, and
   second spring means biased against said clamping jaws to cause said clamping jaws to be biased against said suction tube to resist vertical movement of the suction tube.

2. The suction head apparatus according to claim 1, characterized in that the suction tubes are constructed of a rigid material.

3. The suction head apparatus according to claim 2, characterized in that the suction tube material is plastic.

4. The suction head apparatus according to claim 1, characterized in that each of said pair of clamping jaws are pivotally mounted within said tube coupling.

5. The suction head apparatus according to claim 4, characterized in that each of said pair of clamping jaws pivots about a horizontal axis at one end thereof and engages the suction tube at the other end thereof such that said clamping jaws tend to unclamp said suction tube when said suction tube is moved vertically upwardly into said tube coupling and tend to clamp said suction tube to resist vertically downwardly movement of said suction tube to thereby retain said suction tube within said tube coupling.

6. The suction head apparatus according to claim 1, characterized in that each of said suction tubes has a rigid conical grip face.

7. The suction head apparatus according to claim 1, characterized in that each of said tube couplings includes a second vertical bore coaxial with that of the suction tube, a sleeve element is received within each of said second vertical bores, each of said sleeve elements includes a third vertical bore which receives said suction tube and wherein said sleeve element is adapted to be moved vertically upwardly between said suction tube and said clamping jaws to cause said clamping jaws to be biased away from said suction tube against the action of said second spring means to thereby enable the displacement of the suction tube from the tube coupling to be adjusted.

8. The suction head apparatus according to claim 7, characterized in that each of said pair of clamping jaws pivots about a horizontal axis at one end thereof and engages the suction tube at the other end thereof and wherein said pair of horizontal pivot axes are displaced from said suction tube such that said sleeve element may slide between said suction tube and said clamping jaws to bias said clamping jaws away from said suction tube.

9. The suction head apparatus according to claim 7 characterized in that the suction tubes are constructed of a rigid material.

* * * * *